Patented Apr. 23, 1935

1,998,489

UNITED STATES PATENT OFFICE 1,998,489

BENZYL ESTERS OF HALOGENATED ORTHO-BENZOYL-BENZOIC ACIDS AND PROCESS FOR PREPARING THE SAME

Frank A. Canon and Adolph Zimmerli, New Brunswick, N. J., assignors, by mesne assignments, to E. I. du Pont de Nemours & Company, a corporation of Delaware No Drawing. Application May 27, 1931, Serial No. 540,498

3 Claims. (Cl. 260—64)

This invention relates to novel esters of ortho-benzoyl-benzoic acids and to a process for preparing the same. More particularly, this invention deals with the benzyl ester of ortho-benzoyl-benzoic acid and its neutral substitution derivatives, such as halogen, methyl, methoxy, and the like.

Our novel compounds possess valuable physical properties which make them particularly useful as plasticizers for cellulose ester compositions.

It is accordingly an object of our invention to prepare novel esters which are useful technically for various purposes, and particularly in the art of preparing cellulosic lacquers.

Our novel compounds may be prepared by esterifying ortho-benzoyl-benzoic acid or its neutral substitution derivatives with benzyl alcohol according to any known procedure for esterifying similar compounds. Our preferred method consists of heating the two reactants together in an excess of benzyl alcohol until the water of formation has evaporated, then distilling off the excess benzyl alcohol and recovering the ester. However, other procedures may be adopted, as will be readily understood to those skilled in the art.

The following examples will serve more fully to illustrate our invention, without however limiting the same. Parts given are parts by weight:

Example 1

226 parts of ortho-benzoyl-benzoic acid are dissolved in 216 parts by weight of benzyl alcohol and heated to boiling. A mixture of water and benzyl alcohol distils off and may be condensed to recover the benzyl alcohol. When the distillation of water ceases, which occurs after about 18 parts of water have distilled over, a vacuum is applied to the system, and the excess benzyl alcohol distilled off at about 20 mm. absolute pressure (105° C.)

When the excess benzyl alcohol has been distilled over, the receiver is changed, and the pressure of the system lowered to about 4 mm. absolute, while raising the temperature to about 250° to 260° C. The benzyl ester of ortho-benzoyl-benzoic acid distils over as a colorless liquid which becomes very viscous on cooling. The yield is practically quantitative.

2-benzoyl-1-benzyl-benzoate is insoluble in water, slightly soluble in alcohol; readily soluble in acetone, ethyl-acetate, and benzene. It has a great tendency to form supercooled solutions, but may be recrystallized from alcohol in square colorless plates, melting at 64° C. It can be boiled with water, weak alkalies, or weak acids without undergoing hydrolysis to any appreciable extent. Furthermore, as mentioned above, it is readily soluble in the solvents that are ordinarily used in making lacquers and other cellulose ester compositions, and will not precipitate therefrom by the addition of gums or artificial resins. As a result of this property, it is particularly adapted for use as a plasticizer in lacquers and similar cellulose-ester compositions.

The conditions for ester formation and isolation in the above example may be varied through a wide range. For instance, it is not necessary to heat the reaction mass to boiling, as water will split off even at temperatures only slightly above 100° C. Smaller excesses of benzyl alcohol may be used, and the same may be distilled off at atmospheric pressure, if desired. Nor is it absolutely necessary to distil over the formed ester, unless it is desired to produce the same substantially colorless.

Other modifications will readily suggest themselves to those skilled in the art without departing from the spirit of this invention.

Example 2

260 parts of p'-chloro-benzoyl-ortho-benzoic acid and 390 parts of benzyl alcohol are heated together in substantially the same manner as in Example 1. After distilling off the greater part of the excess benzyl alcohol, the reaction mass is filtered to eliminate precipitated impurities, and allowed to stand over night, whereupon it is converted into a semi-solid mass containing some crystals. These may be isolated by suction-filtering, and further purified by redissolving in benzyl alcohol, boiling with charcoal, filtering, and recrystallizing. If desired, the recrystallization may be repeated several times, using as solvent benzyl alcohol, petroleum naphtha, or xylol. The final product is a white crystalline solid melting at about 82–83° C. It constitutes 2-p'-chloro-benzoyl-1-benzyl-benzoate, and corresponds most probably to the formula

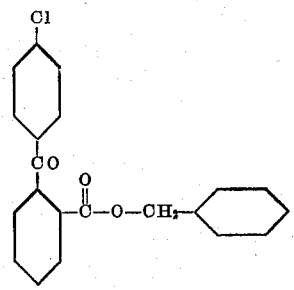

We claim:

1. As a new product, 2-p'-chloro-benzoyl-1-benzyl-benzoate.

2. The process of preparing the benzyl ester of an orthobenzoyl-benzoic acid compound which comprises heating an ortho-benzoyl-benzoic acid compound of the series consisting of ortho-benzoyl-benzoic acid and its neutral substitution derivatives in an excess of benzyl alcohol until the water of formation has distilled off, removing the excess benzyl alcohol, and recovering the ester.

3. The benzyl ester of Bz'-halogen-benzoyl-ortho-benzoic acid.

FRANK A. CANON.
ADOLPH ZIMMERLI.